(12) United States Patent
Forbes et al.

(10) Patent No.: US 8,447,847 B2
(45) Date of Patent: May 21, 2013

(54) CONTROL OF SENSOR NETWORKS

(75) Inventors: Scott C Forbes, Redmond, WA (US); Gregory Baribault, Lynnwood, WA (US); Ruston John David Panabaker, Bellevue, WA (US); William Jefferson Westerinen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 469 days.

(21) Appl. No.: 11/770,017

(22) Filed: Jun. 28, 2007

(65) Prior Publication Data
US 2009/0006589 A1    Jan. 1, 2009

(51) Int. Cl.
*G06F 15/173* (2006.01)

(52) U.S. Cl.
USPC .......................................................... 709/223

(58) Field of Classification Search
USPC ........................................ 709/201, 223–226
See application file for complete search history.

(56) References Cited

U.S. PATENT DOCUMENTS

| | | | |
|---|---|---|---|
| 6,035,240 A | 3/2000 | Moorehead et al. | |
| 6,167,333 A | 12/2000 | Gehlot | |
| 6,237,647 B1 | 5/2001 | Pong et al. | |
| 6,405,135 B1 | 6/2002 | Adriany et al. | |
| 6,690,374 B2 | 2/2004 | Park et al. | |
| 6,816,862 B2 | 11/2004 | Mulgund et al. | |
| 6,895,572 B2 | 5/2005 | Miyata et al. | |
| 6,912,484 B2 * | 6/2005 | Bibelhausen et al. | 702/188 |
| 7,069,188 B2 | 6/2006 | Roberts | |
| 7,506,369 B2 * | 3/2009 | Buch et al. | 726/12 |
| 2004/0098395 A1 | 5/2004 | Hisano | |
| 2004/0107281 A1 * | 6/2004 | Bose et al. | 709/226 |
| 2004/0218602 A1 * | 11/2004 | Hrastar | 370/390 |
| 2005/0063333 A1 * | 3/2005 | Patron et al. | 370/329 |
| 2005/0212918 A1 * | 9/2005 | Serra et al. | 348/208.14 |
| 2006/0064477 A1 | 3/2006 | Renkis | |
| 2006/0077918 A1 | 4/2006 | Mao et al. | |
| 2006/0088014 A1 | 4/2006 | Ganesh | |
| 2006/0142978 A1 * | 6/2006 | Suenbuel et al. | 703/1 |
| 2006/0271700 A1 * | 11/2006 | Kawai et al. | 709/233 |
| 2007/0019569 A1 * | 1/2007 | Park et al. | 370/254 |
| 2007/0043803 A1 * | 2/2007 | Whitehouse et al. | 709/201 |
| 2007/0112803 A1 * | 5/2007 | Pettovello | 707/100 |
| 2007/0174467 A1 * | 7/2007 | Ballou et al. | 709/227 |
| 2007/0233881 A1 * | 10/2007 | Nochta et al. | 709/228 |
| 2007/0283001 A1 * | 12/2007 | Spiess et al. | 709/224 |
| 2008/0031213 A1 * | 2/2008 | Kaiser et al. | 370/338 |

(Continued)

OTHER PUBLICATIONS

Shen, et al., "Sensor Information Networking Architecture and Applications", IEEE Personal Communications, Aug. 2001, vol. 8, No. 4, IEEE, 2001, pp. 52-59.

Ward, et al., "A New Location Technique for the Active Office", IEEE Personal Communications, vol. 4, No. 5, Oct. 1997, IEEE, 1997, pp. 42-47.

(Continued)

*Primary Examiner* — Jason Recek
(74) *Attorney, Agent, or Firm* — Lee & Hayes, PLLC (57) ABSTRACT

A method and apparatus is provided for generating an index and creating a network of devices based on the index. Information and data may be provided via the network. In one example, a request may be received from a user at a service. The service may maintain an index containing characteristics of devices. Any number or type of devices may be selected to participate in the network. Also, the network may be subsequently modified by the addition or removal of any device from the network. Information or data received from the network devices may be returned to the user requesting the information via the service.

20 Claims, 7 Drawing Sheets

U.S. PATENT DOCUMENTS

2008/0072301 A1* 3/2008 Chia et al. .................. 726/8
2008/0129465 A1* 6/2008 Rao .................. 340/286.02
2008/0155662 A1* 6/2008 Vykunta .................. 726/5
2008/0243439 A1* 10/2008 Runkle et al. .................. 702/188
2008/0292065 A1* 11/2008 Chen et al. .................. 379/46

OTHER PUBLICATIONS

Bonnet, et al., "Towards Sensor Database Systems", In Proceedings of the 2nd International Conference on Mobile Data Management, vol. 1987, Jan. 2001, pp. 12.

* cited by examiner

CONTROL OF SENSOR NETWORKS

BACKGROUND

Information may be obtained via a network of devices. However, providing high-level programmatic access and/or control of numerous different sensor networks has not been accomplished to date. When creating such a high-level network, there are typically difficulties in knowing what resources are available or what functionality is associated with each of the resources. Therefore, assembling such devices into a network such that desired information or functions may be obtained in an efficient manner has been problematic.

In addition, with multiple users requesting network resources, there have typically been problems in effectively providing access to networks for each user. Often, conflicts or confusion exist such that users typically either fail to connect with a desired network as desired or the network created is not optimal for a particular user's needs.

Therefore, there exists a need for creating networks of any number or type of devices for a desired use in an efficient manner.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one example, a method for providing data via a federated network is described. A service may receive a request for information from a user. The service generates a network by selecting data capture devices and including the data capture devices in the network. In another example, the service may contain an index that stores information on the devices such as the data capture devices. The information may include characteristics of the devices such as, but not limited to, location of the devices, orientation of the devices, movement of the devices, functionality of the devices, etc. The service may access the index and determine devices to include in the network based on matching of the index data of the devices and the input request.

In another example, a service is described in which a request may be received via an input and an index containing information pertaining to network devices may be stored in an index module. Also, the service may contain an analyzer for selecting network devices for a network. In one example, the network may be selected based on information obtained from the index.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

A method and system for facilitating federation of user devices in a network is described. Such a network may include federated devices in a federated network for performing a task or function. Each of the devices in the federated network may have a functionality or capability for performing the task or function. The network may encompass substantially all of the devices in the federated network. Such a network may be termed a constellation network or, alternatively, a federated constellation network. The specification alternatively refers to such a network as a federated network, a constellation network or a federated constellation network.

Figure 1:
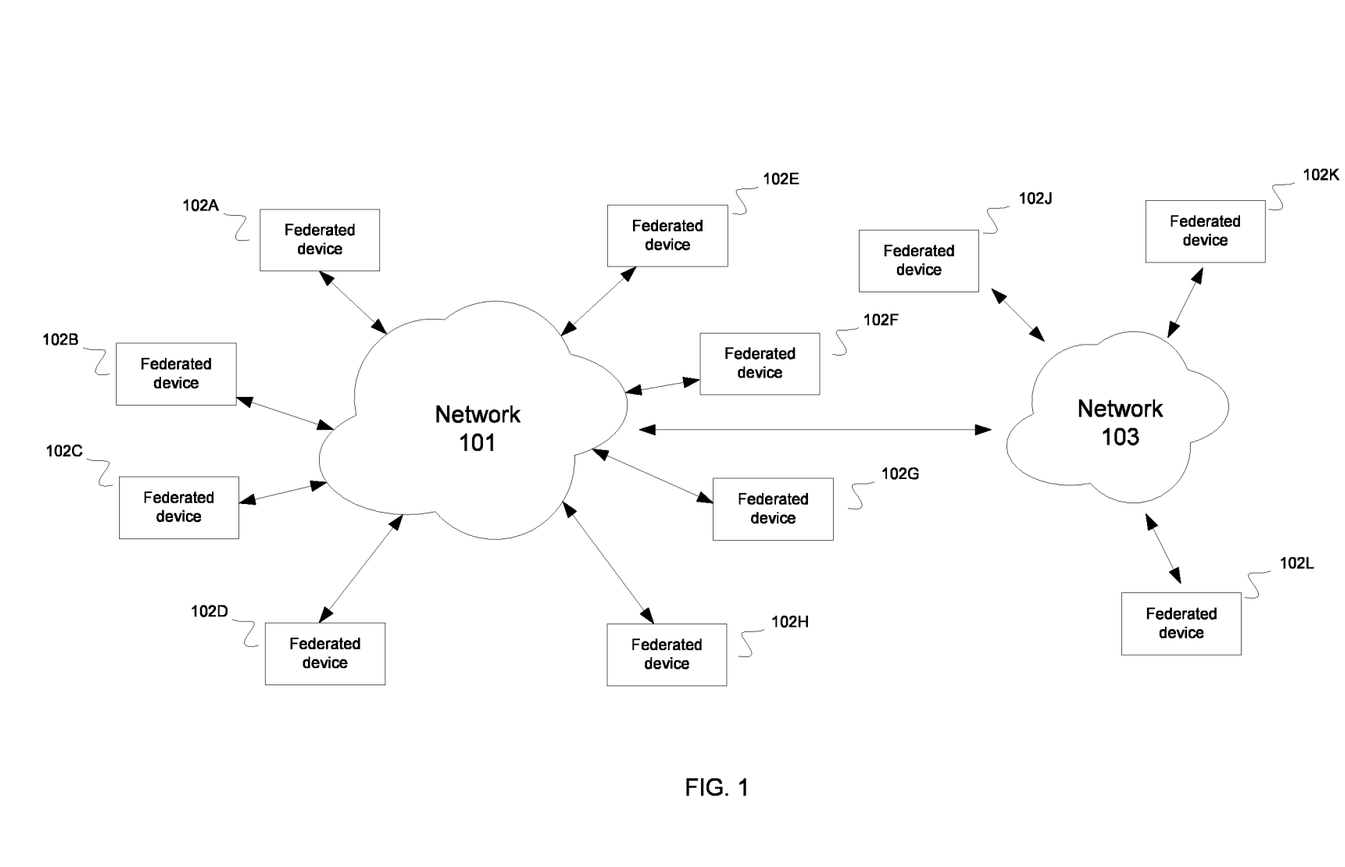
FIG. 1 is a partial block diagram illustrating a network of federated devices.

FIG. 1 is a partial block diagram illustrating an example of a network of federated devices or a federated constellation network. In this example, federated devices (102A, 102B, 102C, 102D, 102E, 102F, 102G, 102H) may be connected in a network 101 and exchange data via the network 101. The federated devices may be of any type of device capable of exchanging data. For example, a federated device may be an MP3 player, a stereo system, a media center, a telephone, a mobile device, a handheld digital device, a camera, etc. At least some of the federated devices may be capable of controlling the presentation or delivery of data. One example of such a device includes an MP3 player that is capable of controlling the delivery of audio data by controlling the volume, balance, etc. Another example of a device may include a camera device such as a webcam. In addition, any of the devices, such as a webcam device may be re-positioned or located at any desired location and/or in any orientation at any location.

In addition, as FIG. 1 illustrates, any number or type of networks of any number or type of devices may be interconnected. For example, devices (e.g., device 102J, 102K or 102L) may form an additional network (e.g., network 103). Although FIG. 1 illustrates two networks that are interconnected, any number of networks may be interconnected. Each of the network may be of any size and may contain any type of device. The additional federated network 103 as illustrated in FIG. 1 may include any number or type of devices. In one example, network 103 may also contain any number of devices from network 101. The devices connected in federated network 103 may communicate via network 103. Network 103 may be connected to network 101 such that any device from network 103 or network 101 may communicate. For example, device 102J, 102K, and/or 102L may communicate with each other or with any of devices 102A-102H in this example. Communication may be accomplished via network 103 and/or network 101. Any of the networks may include an index that contains information relevant to the corresponding network, such as described in more detail below.

The devices may have unique characteristics or may have characteristics in common with other devices in the network. For example, each of the devices may have a particular capability or capabilities, may be located at a particular location, may be oriented in a particular direction or configuration, etc. In addition, any of the devices may share similar characteristics with other devices, for example, one device may share a location with another device which may depend on a sensitivity of location measuring technology. For example, a point of reference may be located within a distance that is shorter than the sensitivity of the location measuring method employed. In this case, different devices that are located that distance from the point of reference (or less) may be characterized by the same location. In one example to illustrate, a location measuring technology may have a sensitivity of 10 feet such that any entity located within 10 feet of a point of reference may be considered to be approximately at the same location. If multiple devices are located within 10 feet of the point of reference, then in this example, the multiple devices may be identified at the same location. However, additional information may be employed that may further differentiate the devices. For example, orientation of each device or capability of each devices may still differ between at least some of the devices.

Figure 2:
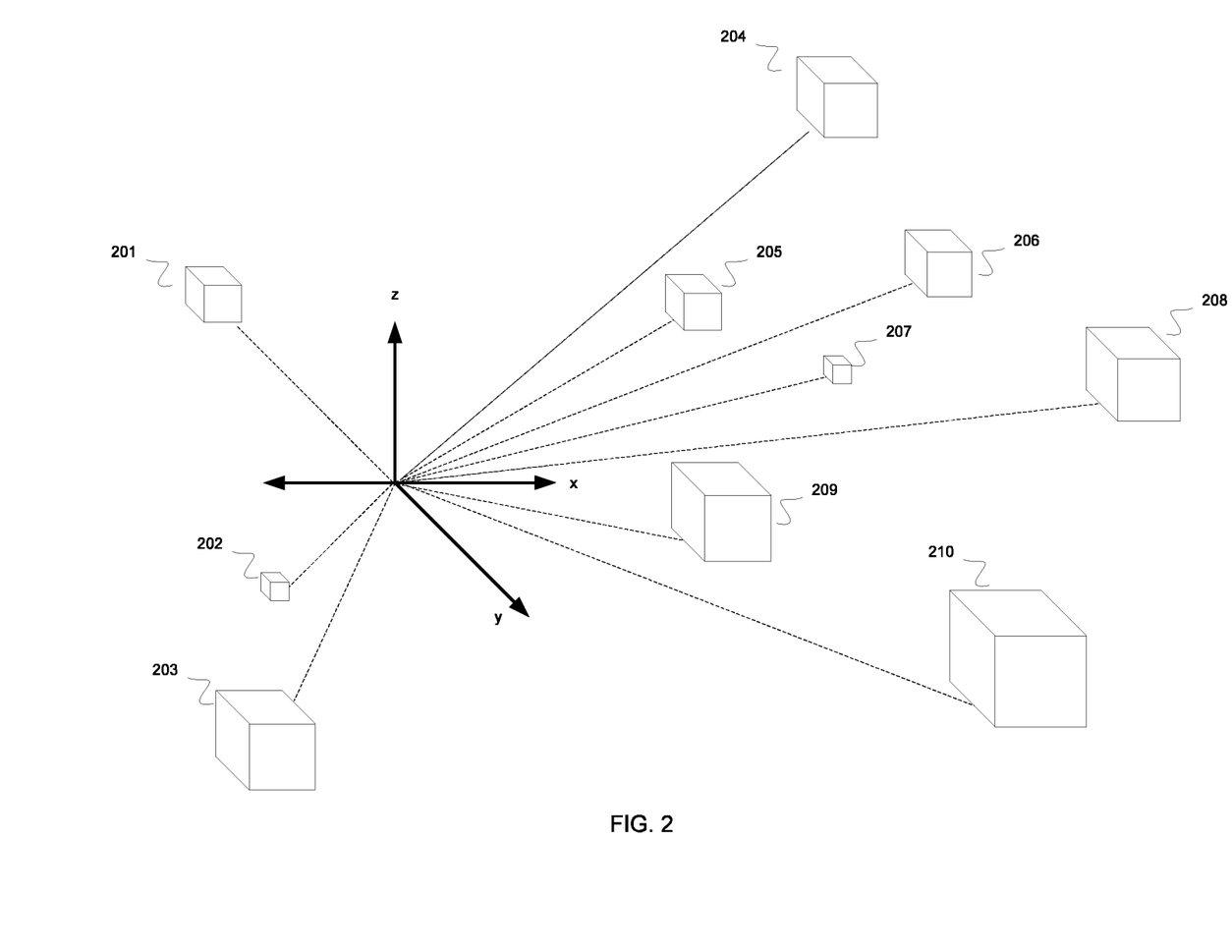
FIG. 2 illustrates an example of multiple devices in a network arranged in space.

FIG. 2 illustrates an example of multiple devices in a network arranged in space. The network in this example includes devices 201-210. The devices may be any type of device including mobile devices, recording devices, audio devices, video devices, webcams, etc. Also any of the devices may be located at any location and may also be moved to alternate locations. As FIG. 2 illustrates, each device may be located at a particular location that may be characterized, for example, in location coordinates (e.g., x-y-z coordinates). Hence, the location of any device may be known or specified. For example, a server or control device may receive input from any of the devices (e.g., device 201-210) indicating corresponding locations of the devices. Also, if any device moves to another location, the location information or movement information corresponding to the new location or the movement of the device may be sent to the server or control device. The information corresponding to the re-located device may be updated with the new location of the device. Also, additional information may be included for the device. The additional information may include, for example, motion information, device orientation information, functional information, capability information, etc. Any type of information relevant to the device may be included.

Figure 3:
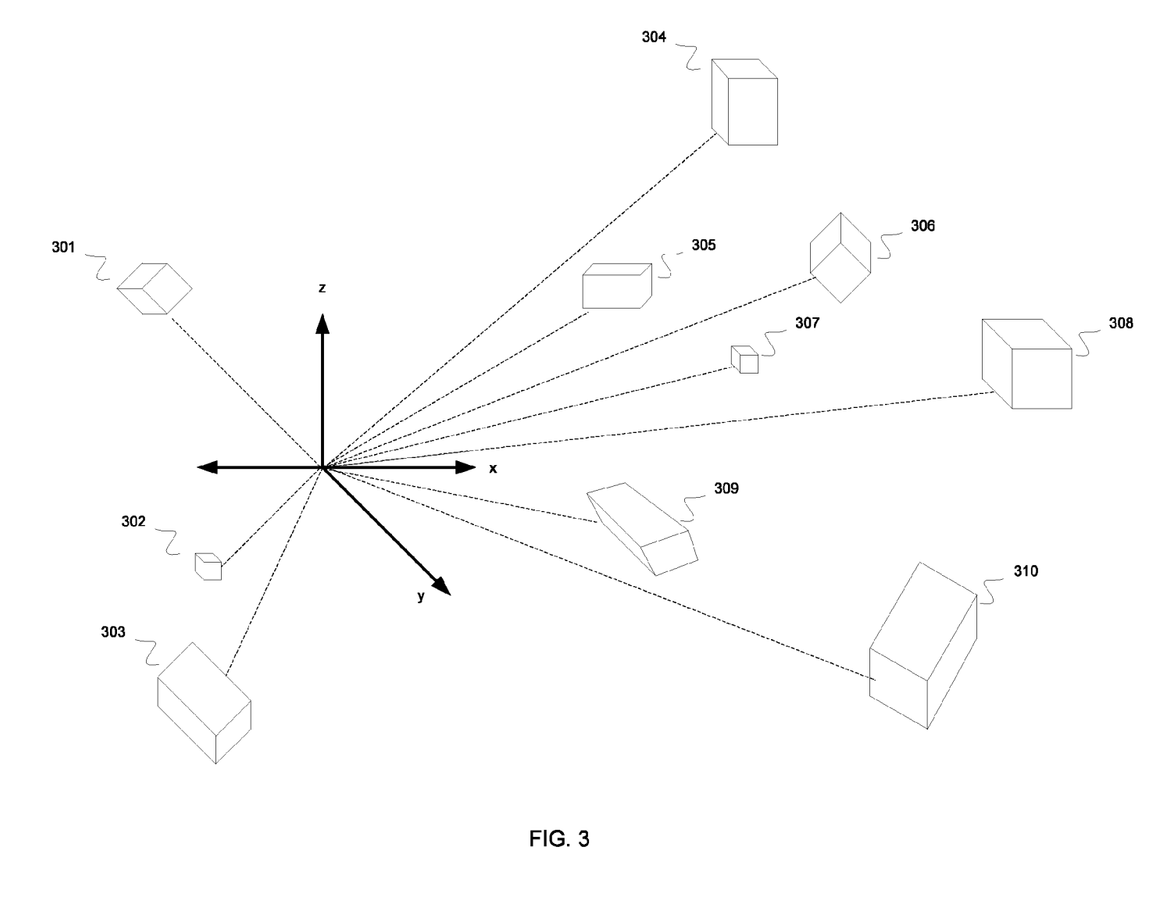
FIG. 3 illustrates an example in which devices participate in a federated network.

FIG. 3 illustrates an example in which devices participate in a federated network. In this example, the devices (301-310) may communicate information to a central or control device. The information may include orientation information for each corresponding device. As FIG. 3 illustrates, each of the devices (301-310) are oriented in different ways. For example, device 304 is oriented such that device 304 may face upward in the z-direction whereas device 302 may face along the y-axis and device 305 may be oriented along the x-axis. Other devices illustrated in the example of FIG. 3 are oriented in other ways. Hence, any device may be oriented in any direction. Also, any of the devices may change orientation to face a different direction. For example, a device may include a camera device that tracks a moving object. The camera device may capture an image of an object in motion. As the object moves through space from one location to another location, the camera device may re-orient to follow the movement of the object. Any additional camera devices may also track the motion of the object. The different camera devices tracking the movement of the object may capture the object from different orientations.

As the camera devices move to track the moving object in this example, information for each of the camera devices may be recorded. The information may include any pertinent information pertaining to the camera devices such as movement information, location information, functionality, etc. This information may be stored in a central device such as a server that receives information from the tracking or camera devices in the network. Alternatively or additionally, the information may be stored in any other device such as another device within the network of camera devices. In this example, one of the camera devices may include a memory for storing the information of other camera devices in the network. Alternatively, a different type of device may be present in the network for storing information of the camera devices in this example.

The information associated with the devices in the network (i.e., federated devices) may be accessed by a requestor or user. The requestor may send a request for information to a service which may contain information from the network devices. Based on the stored information in the service, the requestor may receive relevant information from the service.

Figure 4:
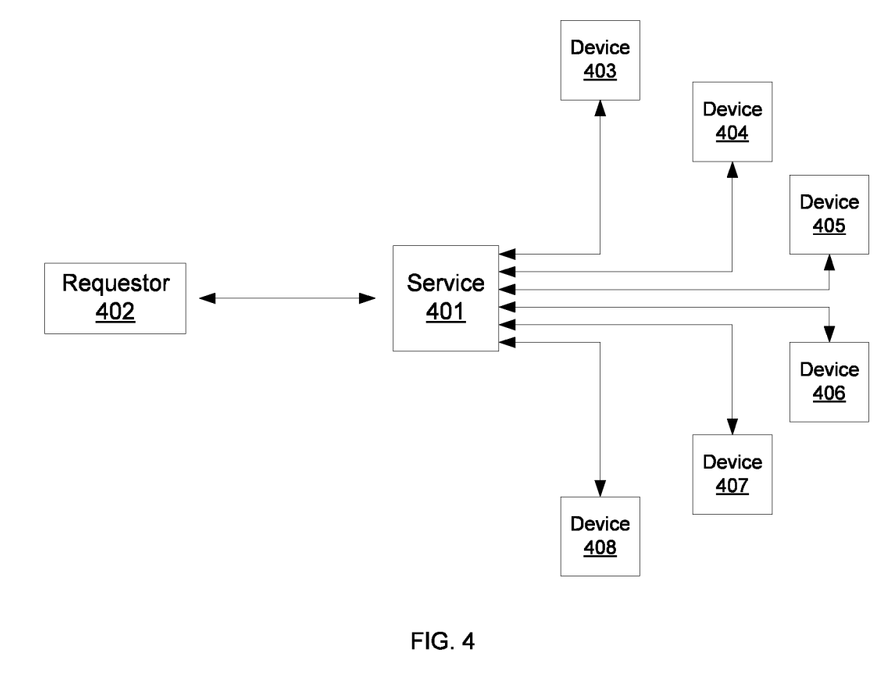
FIG. 4 illustrates an example of a system in which information from federated devices may be provided to a requestor.

FIG. 4 illustrates an example of a system in which information from federated devices may be provided to a requestor. In this example, a requestor 402 may send a request for information to a service 401. The service 401 receives the request from the requestor 402 and may identify devices in a federated network that may be capable of providing the requested information. In FIG. 4, devices 403, device 404, device 405, device 406, device 407, and device 408 are illustrated, however, any number or type of device may be included in the network.

Information corresponding to any of the devices (e.g., device 403408) may be received by the service 401 from a respective device. The service 401 may further store the received information. This information may be received at the service 401 and may be stored locally at the service 401 or may be stored at any remote device such as a server or one of the devices in the network. The information stored either locally at the service 401 or remotely may include any relevant information pertaining to the devices (403-408) or network. For example, the information may include location information, information pertaining to capabilities of the devices, movement of the devices, orientation or positioning of the devices, availability information, etc.

In addition, the service 401 may execute an algorithm or program, which may be responsive to input received from the requestor 402. Based on the execution, the service 401 may receive information associated with any of the devices (e.g., device 403-408). The service 401 may also contain previously stored information pertaining to any of the devices and provide information relevant to a request received from the requester 402.

The requestor 402 may further identify desired devices for forming an ad hoc network of devices (e.g., federated devices) such that a requested task may be performed. For example, a requester 402 may send a request for a specific task or function. The service 401 receives the request from the requester 402 and identifies devices in a network for providing the requested information or function. The service 401 in this example may select devices in the network to participate in the provision of the requested information or function based on information from the devices. The information may be previously received and/or stored at the service 401 from each of the devices in the network (e.g., devices 403-408) or may be received in real-time from the devices after a request is received from the requester 402.

Information received at the service 401 from the devices in the network may further be stored in an index or database. The index may contain any number of fields for indicating values for characteristics of the devices in the network. For example, the index may contain information on capabilities of the devices. In this example, device 403 may be a camera device and device 404 may be an audio device. The requester 402 may request an image or video data pertaining to a subject of interest. Based on information in the index that may identify the type of devices in the network, the service 402 may determine that the camera device (i.e., device 403 in this example) has the capability to provide video and/or image data and may further determine that the audio device (i.e., device 404 in this example) lacks the capability to provide image data.

The index may also contain any other relevant information. For example, the index may also contain location information or positioning or orientation information for the devices such that, based on the information in the index, the service 402 may determine that a device may be located at a proper location to provide the desired information. In this example, the index may contain information indicating that device 403 (i.e., the camera device) is located in the vicinity of the subject matter requested by the requestor 402.

The service 401 may further generate an ad hoc (i.e., federated) network of devices to provide the requested information by selecting devices for participation in the federated network. Devices may be selected based on criteria from the index but may also change characteristics. As characteristics of the devices change, the information in the index may be updated. For example, characteristics of a device may change and the device may send updated information to a central storage device to update stored information on the device. If a device no longer meets desired criteria, the device may be removed from the network. Likewise, devices that do not meet desired criteria may change to acquire desired characteristics. These devices may be added to the network. Hence, the network formed may change based on corresponding changes in the devices as well as changes in the desired function or information.

Figure 5:
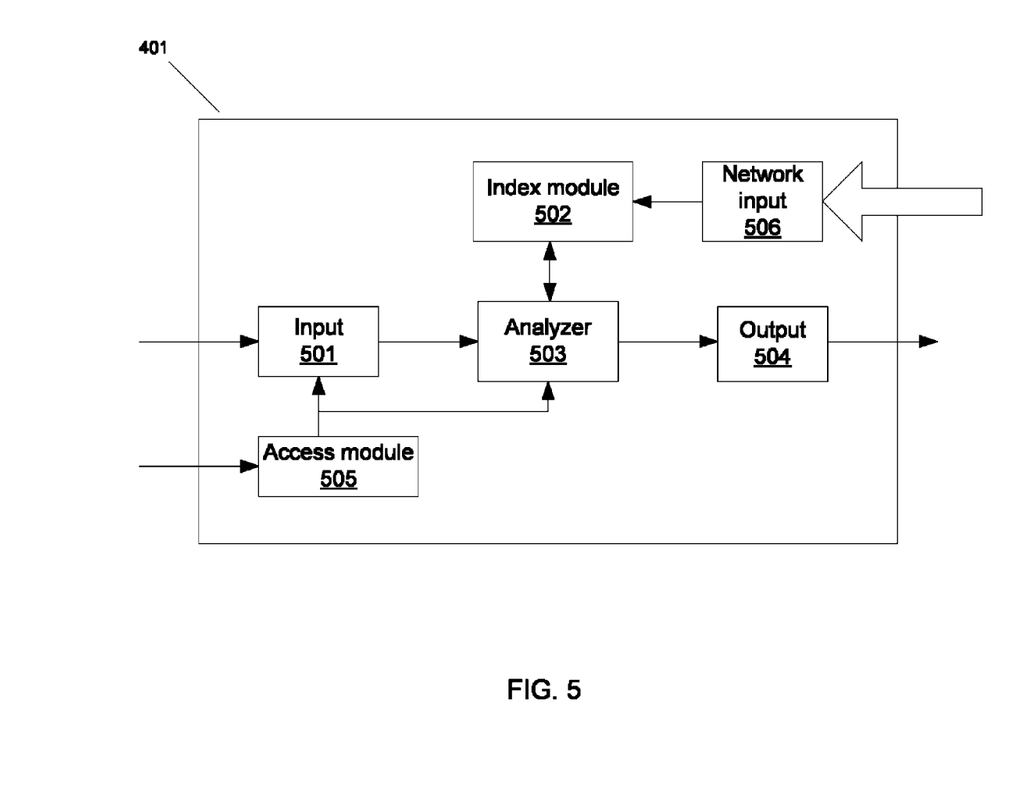
FIG. 5 illustrates an example of a service.

FIG. 5 illustrates an example of a service. The service 401 may provide requested information or functions based on network device information. The network device information may further be stored in a database such as an index. In this example, the service 401 may contain an input 501 for receiving information from a user, an index module 502 for storing an index or database containing information of network devices, a network input 506 for receiving information from potential network devices, an access module 505 for providing access to information on characteristics or functions of network devices, an analyzer 503 for determining characteristics of network devices and forming network of devices for responding to a request from a requester, and/or an output 504 for outputting information for forming an ad hoc network of device.

In one example, a requestor may desire certain information or may wish to perform a certain function. The requestor may send a request for the desired information or function to the service 401. The request in this example is received at the input 501. The index module 502 in this example stores data corresponding to devices for forming a network. For example, the index module 502 may store information on location of individual devices, orientation of the devices, capability of the devices, movement of the devices, characteristics of the devices, etc. The device information may be received from the devices or other external source via the network input 506. For example, a device may transmit location information corresponding to the location of the device to the service 401. This information may be received by the network input 506 and may further be stored in the index module 502. Updated information may also be received via the network input 506 to update information already stored in the index module 502.

Based on this information, the analyzer 503 may determine a device or set of devices for participating in a network to provide the requested information to the requestor. The analyzer 503 receives the request from the requestor via the input 501 and may access the index module 502 to determine devices capable of providing the requested information. For example, the analyzer 503 may identify devices located in the vicinity of desired information based on location information received from the index module 502. The analyzer 503 may also identify devices of a type that are capable of providing the data. This information may also be obtained from the index module 502. These are merely examples as any relevant information of the devices may be obtained from the index module 502. Based on the information, the analyzer 503 may select devices for participating in the network. The analyzer 503 outputs commands via output 504 to generate the ad hoc network for providing the requested information. Information received from the device in the ad hoc network may then be returned to the requestor.

In another example, the service 401 may also contain an access module 505 for controlling access to different devices. For example, a device in the network may have certain access criteria such that certain services may access the device while other services may not access the device. The analyzer 503 may access the access module 505 to determine if access of a particular device is permitted for the service. If the service has access to the device, then the access module 505 may permit the analyzer 503 to access the device via output 504. Also, a service 401 may be granted access to a device. For example, the service 401 may subscribe to a device, may bid for access to the device, or may purchase a use of the device. Any method of permitting access may be used in this example. When the service 401 is granted access to the device, the access module 505 may permit the service 401 to access the device or instruct the device to generate requested results.

Figure 6:
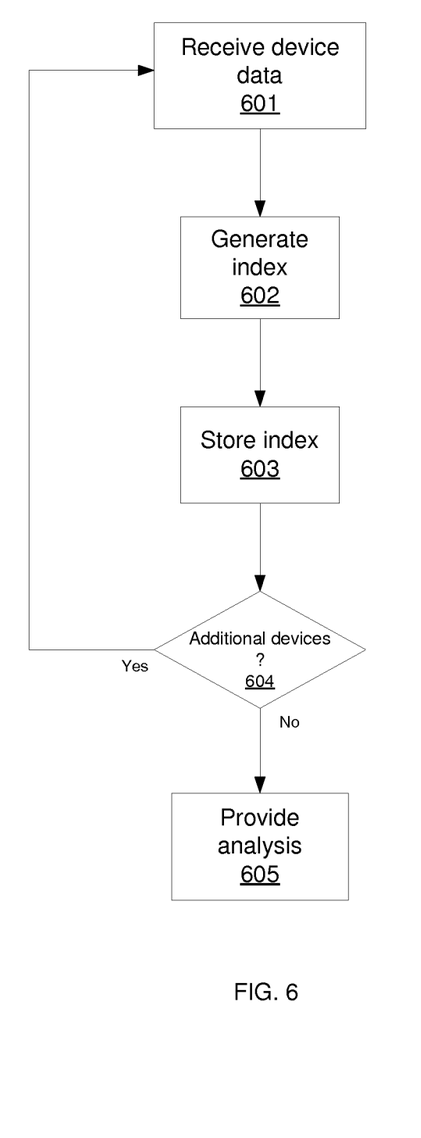
FIG. 6 is a flowchart illustrating an example of a method for generating an index.

FIG. 6 is a flowchart illustrating an example of a method for generating an index. In this example, data is received from one or more devices (STEP 601). The devices may include any type of device in a network such as cameras, audio devices, webcams, etc. Each of the devices may send information to a central device or server, for example. The information sent to the central device may include information characterizing each of the devices. For example, each device in the network may send its own information to the central device for storage by the central device. The central device may store the information at any desired location. For example, the central device may store the information received from the devices locally at the service or may store the information remotely.

The service may further generate an index (STEP 602) based on the information from the devices. For example, information describing a location of a device or information describing capabilities of a device may be included in the index. Any desired information may be obtained from a device and/or stored in the index. This information may be later accessed to provide desired information corresponding to any of the devices in which information is stored in the index.

In STEP 603, the index is stored. The index containing information on devices in a network may be stored in the index and the index may be stored in the service. Alternatively or additionally, the index may be stored at any desired location such as at a device in the network or at another remote device. In addition, the process may be an iterative process in which additional device information may be received and stored in the index. For example, in STEP 604, additional devices and/or additional device characteristics or information, if any, are identified. If further information is received ("Yes" branch of STEP 604), the new device information may be received and stored in the index. If device information is complete, then in STEP 604, the service may provide information to a requestor based on the stored index information.

In another example, the index may be updated. For example, the information in the index may be obsolete or outdated if an update has not been performed since a modification of any of the devices. For example, if a device has changed location, changed orientation, or changed in some other quality, but the index is not updated accordingly, then the index information may be outdated. Prior to providing information to a requestor based on the stored index information (STEP 604), the index may be updated to ensure that the most up-to-date information is available and is stored in the index.

Figure 7:
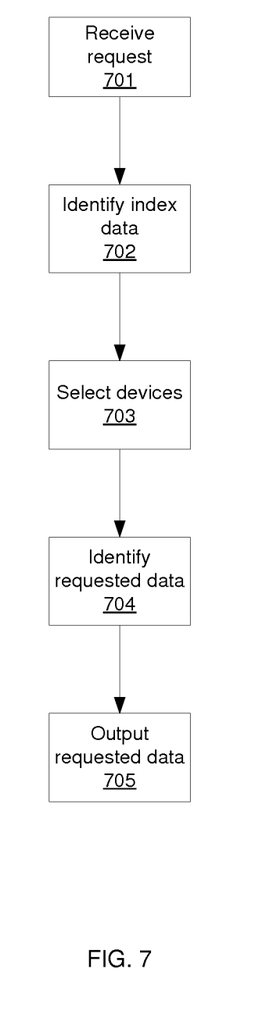
FIG. 7 is a flowchart illustrating an example of providing requested data to a requestor.

FIG. 7 is a flowchart illustrating an example of providing requested data to a requestor. In STEP 701, a request is received from a requestor. For example, the requestor may wish to obtain image data of a particular scene or a particular event. The requestor may request the desired image data from the service. The service receives the request and, based on the request, may identify index data corresponding to the request (STEP 702). For example, if a requestor requests images of a particular event, the service may access index data to determine which devices have access to the event and have the capability of obtaining the desired information. The service may access an index, which may be stored locally at the service or at another location or on a different device. The index may contain information identifying a location for each of the devices, capabilities of each of the devices, etc. Any relevant information may be maintained in the index.

In another example, access to the index or information obtained from the index may be based on the request received from the requestor. In this case, the request from the requestor may have certain characteristics such that particular features may be desired from the index. As one example to illustrate, a request from a requestor may include a request for a rapid response. For example, an emergency situation may exist or the requestor may not wish to wait for a response. In this example, information from the index may be obtained from the information stored in the index and updates to the index may not be performed to provide rapid results to the requestor. Also, a real-time network may not be formed if the requestor desires fast results. Hence, access to the information in the index may be tailored to the type of request received from the requester.

The information for each of the devices in the index may be associated with an identifier for a corresponding device. Information associated with a particular identifier for a particular device indicates the device corresponding to the information. Based on the information and corresponding identifier, the service may identify or select devices (STEP 703) for creating a federated network of devices for providing the requested information. The devices are selected in this example based on the requested information (STEP 704). For example, if a requestor desired image information of an event, the service identifies and selects devices for obtaining the requested data. The requested data is captured by the selected devices and returned to the service, for example (STEP 704). The data obtained from the devices in the federated network is output (STEP 705). Hence, the data obtained from the devices in the federated network of devices may be sent to the requester.

In one example to illustrate, a plurality of sensors may be located at various locations over a specified area. In this example, the sensors collect information and return the information to a service responsive to commands from the service or a request from a requester. The sensors may include any type of sensing device such as a surveillance camera, a webcam, RFID, etc. Also, the devices may be in communication with each other or with a central device via a wireless connection, a wired location, etc.

An index may be stored at the service or at a location accessible by the service. Different clients may use the same index, if desired. The index may be updated as needed. For example, if a sensor changes orientation or location, the updated information may be sent from the sensor to the service. The information may be updated at the service.

In addition, different sensors or other devices may be tested via the service for inclusion in a network. For example, a new device may be detected at the service and may be identified as a potential device for inclusion in a network. Characteristics of the new device may be identified and may also be stored in the index at the service. Based on the information corresponding to the new device, the service may determine if the new device may be added to the network. For example, the service may determine that the new device is capable of working with existing devices in a network. In this case, the new device may be added to the network. Otherwise, the service may deny inclusion of the new device with the existing devices or may request modification of the new device prior to inclusion in the network.

In another example, devices may be federated into an ad hoc network as described. Any number or type of device may be selected for inclusion in the network. Also, any of the devices selected for inclusion in the ad hoc federated network may drop out of the network. For example, multiple devices may be selected for an ad hoc network and the multiple devices may provide requested information. If one or more of the multiple devices drops out of the network for any reason (e.g., while the service is being performed for a requester), the devices that drop out of the network may be replaced with a surrogate or proxy. For example, previously stored data corresponding to the location of the device(s) that dropped out may be provided and the stored information may be used instead of real-time information from the device(s) that dropped out of the network. In this example, a device may have been located at the desired location in the past and may have obtained and stored information at the desired location. This stored information may be stored in the index or accessed when the device drops out of the network. Alternatively, the information may be obtained from any other device. For example, the desired information (e.g., information pertaining to the desired location) may be stored at a different device which may provide the information to the service. Hence, the service may receive information from participating (and available) devices in the network as well as from surrogate or proxies associated with a device that does not or cannot participate in the network.

Devices in a network may also be modified or operated based on actions taken at another device in the network. For example, a network may be generated by a service that includes multiple network devices. A first network device in the group of devices may perform a function which may affect a second network device in the group of devices. Any number of network devices may affect or control actions at another network device. For example, a first network device may detect movement at a particular location. The movement detection of the first network device may be relayed to a service or other device. The service receives the information indicating that a moving object has been detected. Responsive to the received information, the service may activate additional devices or recruit other devices in the vicinity of the first network device and/or the detected moving object. Thus, a cascade of devices may activate based on detection of an event at one of the devices in which devices may be systematically included in a network to provide a requested service or function.

Also, actions taken at one device may cause a reaction at another network device. For example, an act taken at a first network device may damage the first network device (e.g., vandalism). The first network device may detect an unwanted procedure being performed and may send a signal to a second network device. The second network device may be located in the vicinity of the first network device and may receive the signal from the first network device. Alternatively or additionally, the first network device may send the signal to a central server or device. The central server in this example, may send a command to the second network device to control the second network device based on the signal received from the first network device. The second device may receive a command or signal from the first network device and/or the central server and, responsive to the command or signal, the second device may act accordingly. For example, in the event an act of vandalism is performed at the first network device, a second network device, such as a camera, may be invoked as described. In this example, the second network device (i.e., camera in this example) may receive the command/signal from the first network device and/or the central server and, responsive to the command/signal, the second network device may re-orient itself (or may move) to obtain images of the first device and the act of vandalism associated with the first device. In this example, the second network device may capture an image of the individual involved in damaging the first network device based on a request received from the first network device.

In another example, different network devices may communicate and may exchange data. For example, an event may occur in which different sensors or devices may participate. As the event occurs or is ongoing, additional sensors or devices may be desired or certain participating sensors or devices may no longer be needed. Any of the devices may send signals or commands to other devices to activate the other devices such that the other devices may also participate in the network. Also, devices may send messages to other devices that are participating in the network to deactivate the devices if the devices are no longer needed. Alternatively, any device may send a message or command to the service and the service may respond by controlling additional devices to participate in the network (or deactivate certain devices).

In another example to illustrate, any number of sensors of devices may be placed at a location to track changes at the location. For example, multiple sensors may be placed in a forest to track animal movement or other activities associated with the wildlife in the forest. In one example, tracking of endangered species may be desired such that certain sensors may activate to detect the presence of such animals. As the animals of interest relocate throughout the location (i.e., forest), sensors may be turned on or off accordingly as described.

Also, other activities within the forest or any other environment may be monitored. For example, forest fires, wind speeds, rainfall, or any other factors may be monitored via sensor devices placed throughout a specified area such as a forest. In this example, sensors may be activated or recruited to participate in a federated network as needed. For example, weather conditions in a particular sector may be desired. Sensors in the desired sector may be activated via the service as described. In the case in which the weather conditions may move out of the sector, additional devices or sectors outside of the sector may be activated as needed. For example, devices in the network may signal other devices to join the network. The recruitment of other devices may also be performed via a central server or other such device.

In another example, sensors or devices may be placed at certain locations and may further provide a data stream of information to selected users. For example, a user may subscribe to a service such that the user may be provided information from the sensors or devices. In one example, a group of sensors may be located at a particular location and a user may pass the location. Sensor data is received by the user in an aggregated stream. Different levels of information may be provided based on a subscription level of the user. For example, a user may pay a certain fee to participate in the service and to receive desired information via the sensor devices. The user may also pay a different (e.g., higher) fee to obtain an alternate subscription in which additional or more detailed information is provided to the user from the sensor devices. In another example, the information may be provided in real-time or may be time-delayed. This service may also depend on a subscription level.

Alternatively or additionally, access to information may be based on a prioritization scheme. In this example, different users may be granted different levels of access to information from devices in a network or may be granted different types of networks with selected devices. The different levels of access to information may be determined based on characteristics of the users or the like. For example, emergency workers may have a higher priority than a non-emergency worker. In this case, if requests for information or functions are received from an emergency worker and a non-emergency worker at approximately the same time and each of the requests need similar or overlapping resources (or devices), the service may identify each of the requestors based on their roles. Such information may be contained, for example, in an index stored at the service or at a location accessible to the service. The service may determine that the emergency worker has a higher priority than the non-emergency worker and may fulfill the request of the emergency worker first.

If the requests of the emergency worker and the non-emergency worker do not overlap such that different devices may be used in a different network, then the request from the non-emergency worker may be fulfilled by the service prior to completion of the performance of the service/request from the emergency worker. Alternatively, different requestors may subscribe to particular services which may also provide different priority levels. For example, a first requestor may subscribe to a service for a certain fee while a second requestor may subscribe to a higher priced service. The second requestor may have priority over the first requestor such that if simultaneous or nearly simultaneous requests are received at the service from the first and second requesters, the request from the second requestor may take precedence over the request from the first requestor if a conflict of use of resources exists between the two requests.

The prioritization method may also be used to determine the type of network formed. Information may be stored for a type of requestor or user such that selection of devices in a network may be tailored for the specific requestor/user. Also, selection of the devices in the network may be based on the type of request. For example, a user may be identified as a law enforcement official (e.g., police officer) who is tracking a suspect. The service receives a request from the police officer for tracking of the suspect. In this case, the service may identify the requestor as a police officer and/or the request as tracking a suspect. The service may further determine that high resolution images are needed and may select devices capable of providing such high resolution images. The service in this example may thus select only from a pool of video or image devices and may not select from audio-only devices, for example.

If the service determines that an insufficient number of high resolution image capturing devices are available, the service may contact the requestor to inform the requestor of this fact. The requestor (i.e., the police officer in this example) may approve selection of other devices (i.e., low or medium resolution image capture devices). Thus, selection of devices may also be based on input from the requester.

In another example, a service may select devices to generate a network and may further select other services and/or networks. A first service may receive a request for information or a function. The first service contains or has access to an index containing information on data capture devices such as sensors. Based on the location, orientation, capabilities, availability, cost, etc. of the data capture devices available to the first service, the first service may select one or more of the data capture devices to participate in a network to provide the requested information or function. In addition, the index of the first service may contain additional information of other services. This additional information of other services may include, for example, characteristic information on devices available to the second service. One or more devices available to the second service in this example may be unavailable to the first service. However, the first service may have access to the second service and may send a message or request to the second service. The second service receives the message/request from the first service and, responsive to the message/request, the second service may identify data capture devices for participating in data collection or capture to fulfill the request. For example, the second service may contain a second index that contains information pertaining to characteristics of certain data capture devices. Based on the characteristics of the data capture devices available to the second service, the second service may select data capture devices to participate in the network of the first service.

The second service may return a message to the first service informing the first service of the additional devices for participating in the network being generated by the first service. In addition, the second service may control access to the devices available to the second service. In this case, the second service may grant access to the first service such that the first service may access devices available to the second service. Thus, in this example, the first service may activate second service devices to recruit the devices in the network generated by the first service. The generated network of devices may perform the requested function or provide the requested information.

It is understood that aspects of the present invention can take many forms and embodiments. The embodiments shown herein are intended to illustrate rather than to limit the invention, it being appreciated that variations may be made without departing from the spirit of the scope of the invention. Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

The invention claimed is:

1. A system comprising:
input hardware for receiving an input request for information, the input request including an authorization level that corresponds to a high priority level for the input request relative to another input request with another authorization level, the high priority level being assigned based on at least one characteristic of a requester associated with the input request, the high priority level providing a higher priority for responding to the input request over the another input request;
index hardware for storing an index, the index containing a plurality of characteristics of a network device, the characteristics including a movement, a capability, an availability, and a cost of each of network devices;
analyzer hardware for:
selecting a first plurality of network devices and one or more network devices distinct from the first plurality of network devices from a second plurality of network devices based on the index and the input request, one or more capabilities of each of the first plurality of network devices being superior to the one or more capabilities of each of the second plurality of network devices, the one or more capabilities including a resolution of image capture;
determining that the first plurality of network devices has an insufficient number of network devices to provide the requested information; and
in response to the determining that the first plurality of network devices has the insufficient number of network devices to provide the requested information, selecting the one or more data capture devices from the second plurality of network devices; and
output hardware for providing a network request for creating a network of devices at least partly based on a result of selecting by the analyzer hardware.

2. The system of claim 1, further comprising network input hardware for receiving the plurality of characteristics of the network device, the network input hardware further storing the received characteristics of the network device in the index hardware.

3. The system of claim 1, wherein the system further receives data from the network device based on the input request and transmits the received data to the requester.

4. The system of claim 1, wherein the plurality of characteristics of the network device further comprises at least one of a location or an orientation of the network device.

5. A method comprising:
receiving an input request for information, the input request including an authorization level that corresponds to a high priority level for the input request relative to another input request with another authorization level, the high priority level being assigned based on at least one characteristic of a requester associated with the input request, the high priority level providing a higher priority for responding to the input request over the another input request;

storing an index, the index containing a plurality of characteristics of a network device, the characteristics including a movement, a capability, an availability, and a cost of each of network devices;

selecting a first plurality of network devices and one or more network devices distinct from the first plurality of network devices from a second plurality of network devices based on the index and the input request, one or more capabilities of each of the first plurality of network devices being superior to the one or more capabilities of each of the second plurality of network devices, the one or more capabilities including a resolution of image capture;

determining that the first plurality of network devices has an insufficient number of network devices to provide the requested information;

in response to the determining that the first plurality of network devices has the insufficient number of network devices to provide the requested information, selecting the one or more data capture devices from the second plurality of network devices; and providing a network request for creating a network of devices at least partly based on a result of the selecting.

6. The method of claim 5, further comprising:
receiving the plurality of characteristics of the network device; and
storing the received characteristic of the network device.

7. The method of claim 5, further comprising:
receiving data from the network device based on the input request; and
transmitting the received data to the requester.

8. The method of claim 5, wherein the network devices are devices that are capable of exchanging data.

9. The method of claim 5, wherein the network devices include one or more data capture devices.

10. The method of claim 9, wherein the data capture devices include one or more cameras.

11. The method of claim 5, wherein the selecting comprises:
accessing the index;
matching characteristics of one or more network devices with the input request; and
selecting the first plurality of network devices from multiple network devices based on the matching.

12. The method of claim 11, wherein the plurality of characteristics further includes a location of the network device and the matching comprises:
identifying a location associated with the input request;
identifying a subset network devices from the multiple network devices in a vicinity of the location associated with the input request; and
marking the identified subset of network devices.

13. The method of claim 11, wherein the matching comprises:
identifying a capability associated with the input request;
identifying a subset of network devices from the marked network devices having a capability corresponding to the identified capability; and
marking the identified subset of network devices having the capability.

14. The method of claim 5, wherein the plurality of characteristics further includes a device orientation of the network devices, and the selecting comprises:
identifying the device orientation from the index for one or more network devices;
modifying the device orientation of the one or more network devices, the modified device orientation corresponding with the input request; and
including the one or more network devices with the modified device orientation.

15. The method of claim 5, further comprising sending a service request to a remote service, the service request including a characteristic of the input request, and receiving a message from the service responsive to the service request, wherein the selecting is at least partly based on the message from the service.

16. The method of claim 5, further comprising modifying the selected devices, the modifying comprising:
receiving an updated characteristic from a network device in the first plurality of network devices;
updating the index based on the updated characteristic; and
modifying the network of devices based on the updated index.

17. The method of claim 16, further comprising:
matching the updated characteristic with the input request; and
including the network device associated with the update characteristic in the network of devices based on the matching of the updated characteristic with the input request.

18. The method of claim 17, wherein:
the matching the updated characteristic with the input request comprises identifying a mismatch between the updated characteristic and the input request; and
the including the network device associated with the updated characteristic in the first plurality of network devices includes excluding the network device associated with the updated characteristic from the network of devices.

19. One or more memory having stored therein computer executable modules that are executable by a device to perform actions comprising:
receiving an input request for information, the input request including an authorization level that corresponds to a high priority level for the input request relative to another input request with another authorization level, the high priority level being assigned based on at least one characteristic of a requester associated with the input request, the high priority level providing a higher priority for responding to the input request over the another input request;

storing an index, the index containing a plurality of characteristics of a network device, the characteristics including a movement, a capability, an availability, and a cost of the network device;

selecting a first plurality of network devices and one or more network devices distinct from the first plurality of network devices from a second plurality of network devices based on the index and the input request, one or more capabilities of each of the first plurality of network devices being superior to the one or more capabilities of each of the second plurality of network devices, the one or more capabilities including a resolution of image capture;

determining that the first plurality of network devices has an insufficient number of network devices to provide the requested information;

in response to the determining that the first plurality of network devices has the insufficient number of network devices to provide the requested information, selecting the one or more data capture devices from the second plurality of network devices; and providing a network request for creating a network of devices at least partly based on a result of the selecting.

20. The one or more memory of claim 19, wherein the network devices include one or more data capture devices.

* * * * *